Oct. 13, 1931.  M. NASTRI  1,827,435
RESILIENT AUTOMOBILE FENDER
Filed Sept. 12, 1927   2 Sheets-Sheet 1
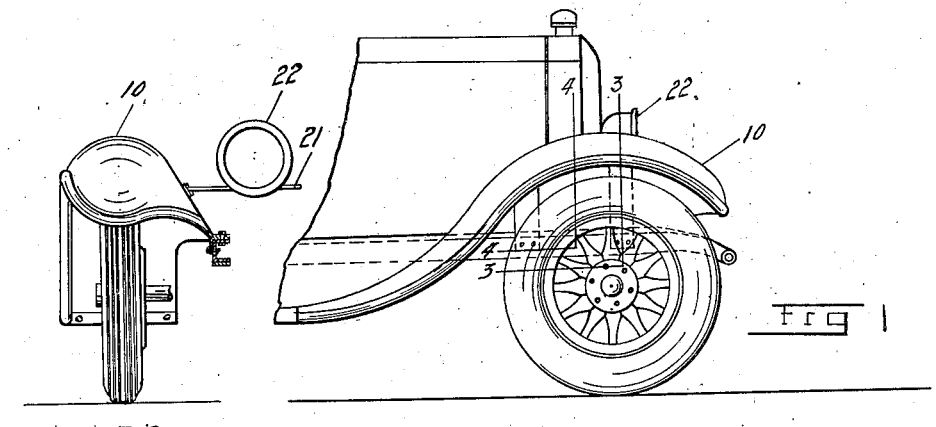
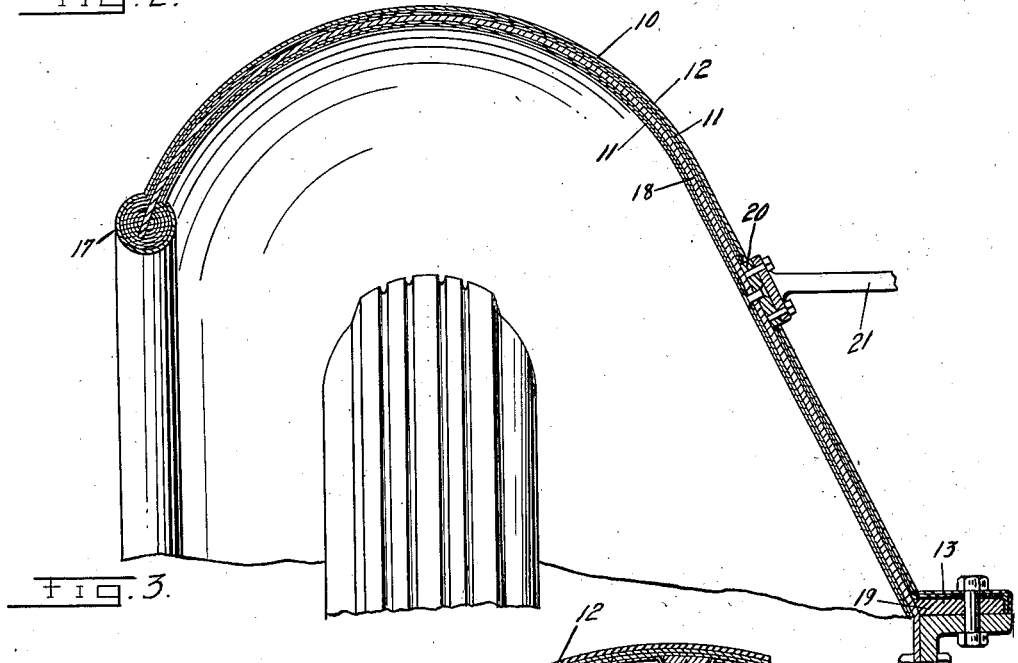
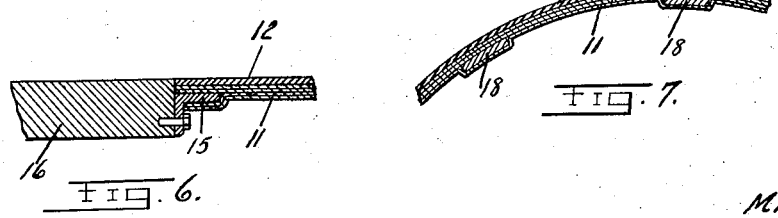
INVENTOR.
MATTHEW NASTRI
BY Ely. T Barrow
ATTORNEYS.

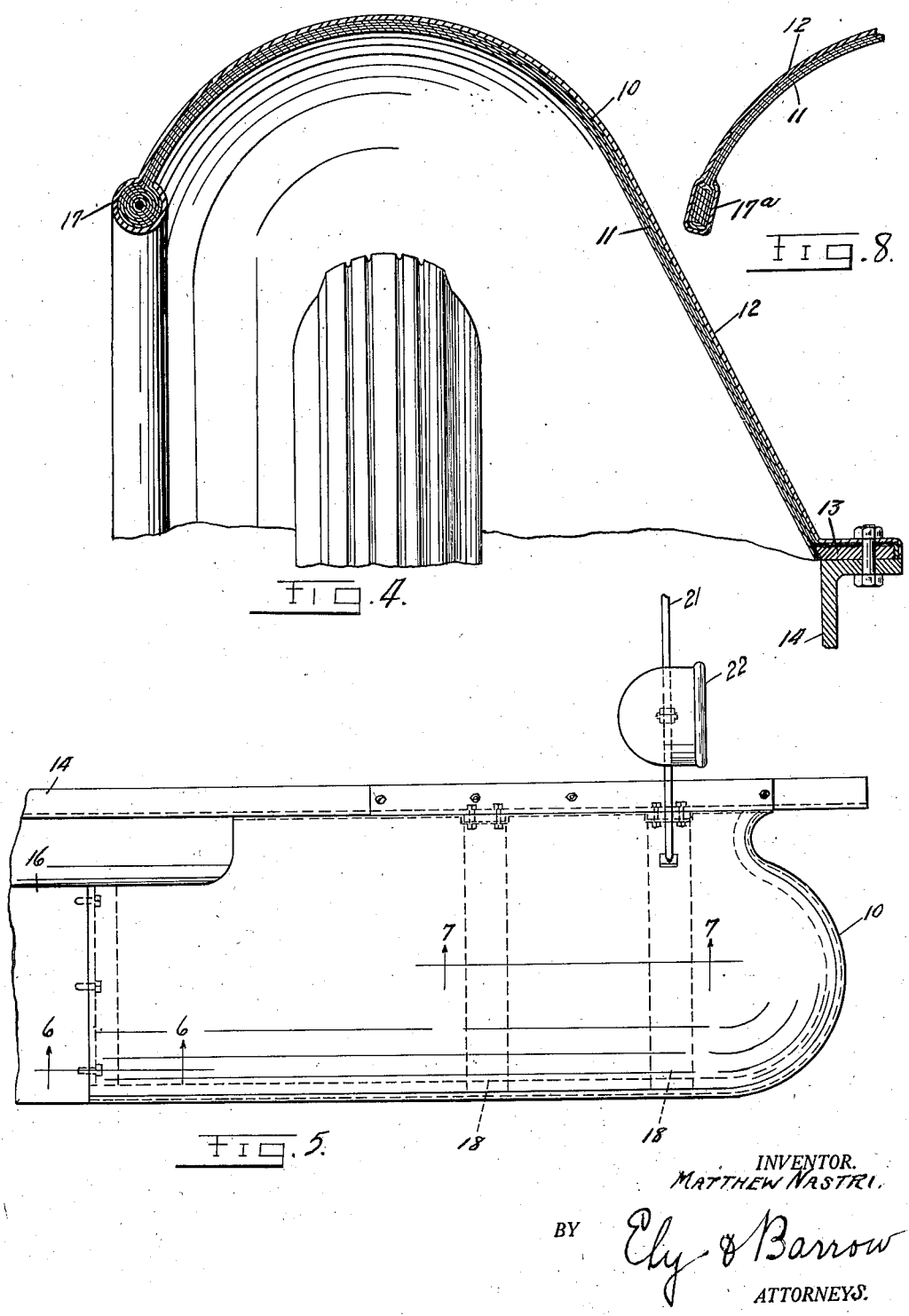

Patented Oct. 13, 1931

1,827,435

UNITED STATES PATENT OFFICE

MATTHEW NASTRI, OF AKRON, OHIO

RESILIENT AUTOMOBILE FENDER

Application filed September 12, 1927. Serial No. 218,911.

This invention relates to resilient fenders for automobiles and the like and has for one of its objects the provision of a flexible, resilient fender or mud guard which cannot become distorted or crushed by collision. A further object is to devise a one-piece laminated, integrally constructed fender and mud guard which is resilient over its entire surface, whereby any portion thereof may spring back to its normal contour after being distorted. Another object is to devise a fender, the entire body of which is resilient and flexible, and which is mounted on the frame of an automobile by resilient supporting means extending transversely across the entire body of the fender. Another object is to provide improved means embedded in the fender for mounting the same to the frame of an automobile.

The foregoing and other objects are obtained by the device illustrated in the accompanying drawings and described below. It is to be understood that the invention is not limited to the specific form thereof disclosed herein.

Of the accompanying drawings,

Figure 1 is a side elevation of a device embodying the principles of the invention;

Figure 2 is a front elevation thereof;

Figure 3 is an enlarged scale transverse section taken on the line 3—3 of Figure 1;

Figure 4 is an enlarged scale transverse section taken on the line 4—4 of Figure 1;

Figure 5 is an enlarged scale plan view of the device;

Figure 6 is a vertical section taken on the line 6—6 of Figure 5;

Figure 7 is a vertical section taken on the line 7—7 of Figure 5; and

Figure 8 is a detail section illustrating a modified form of reinforced edge.

Referring to the drawings, 10 represents an all-flexible fender composed of a number of laminations or plies 11 of rubberized or frictioned fabric, having an outer layer 12 of rubber, the whole being vulcanized and molded into its integral, one-piece finished form. Running along the inner margin of the fender and vulcanized thereto is a metal reinforcing strip 13 for attaching the fender to the frame 14 of the automobile. A section 15 of angle iron or brass is embedded and molded in the rear margin of the fender for attaching the latter to the running board 16 as shown in Figure 6. If desired the outer margin or edge of the fender may be reinforced by inserting therein a roll 17 of rubberized fabric to provide added strength at the edge portions and yet to leave the fender sufficiently resilient to prevent permanent distortion. If it is desired to maintain a smooth outer contour, the thickness of the roll may be positioned inwardly of the fender surface or may be formed of flat strips 17ª as shown in Figure 8.

In order to support the fender and to prevent the outer margins from vibrating, one or more resilient spring steel strips 18 are embedded between the plies of the fabric and molded in place with the thickness of the strips projecting toward the under side of the fender, as illustrated in Figure 7, to retain a smooth outer surface. It is preferred to extend the strips transversely across the entire body of the fender, as shown in Figure 3, following the contour thereof straight along the side mud guard and curved about the crown, until the ends pass through the reinforcing roll 17. A portion of the curved end of strip 18 may be omitted, however, as long as sufficient support is provided to prevent sagging or vibration of the upper portions of the fender. The lower end of strip 18 is bolted to the frame and may be welded at 19 to strip 13. Figure 3 illustrates a plate 20 attached to strip 18 to serve as a base for the attachment of a guy rod 21 or a bracket for the automobile headlight 22. The rear fender is formed similarly to the front fender illustrated in the drawings, suitable changes being made in the shape and in the attaching means, as will be understood. The fenders are finished with a coating of flexible paint which will be capable of bending with the body of the fender so that the finish may be preserved, or suitable finishing and pigment materials may be added to the rubber layer 12 to provide the desired finished appearance.

It will be seen that an all-flexible, resilient fender is thus provided to be capable of resisting permanent bending, crushing or distortion of any portion thereof and which may be readily mounted on the frame of an automobile and be substantially supported thereon to prevent sagging or vibration. Modification of the structure disclosed herein may be resorted to without departing from the spirit of the invention or the scope thereof as defined by the appended claims.

What is claimed is:

1. A flexible, resilient fender for automobiles comprising laminations of rubberized, textile material, said fender having a rigid strip embedded in the longitudinal edge thereof and anchored in place by the laminations of the fender at said edge and also by vulcanization thereto for attaching said edge of the fender to the frame of an automobile and one end of said fender having a rigid angle bar embedded in the margin thereof and anchored by said laminations and also by vulcanization for attaching said edge to the running board of the automobile, both said bar and said strip being overlaid with the laminated material of the fender so as to be hidden when the fender is mounted on a vehicle.

2. A fender for automobiles, said fender comprising a body of laminated, rubberized material, the edges of said fender where it is to be connected to the adjacent parts of the vehicle having rigid strips embedded therein and overlain by laminations of the body of the fender so that a portion of said strip is exposed for attachment, said strips being anchored by said laminations and also by vulcanization to the body of the fender.

MATTHEW NASTRI.